United States Patent
George et al.

(10) Patent No.: US 6,287,669 B1
(45) Date of Patent: *Sep. 11, 2001

(54) SEALING METHOD AND ARTICLE

(75) Inventors: Clayton A. George, Afton; Michael A. Johnson; Peggy S. Willett, both of Stillwater, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/366,927

(22) Filed: Aug. 4, 1999

Related U.S. Application Data (62) Division of application No. 08/911,742, filed on Aug. 15, 1997, now Pat. No. 5,964,979.

(51) Int. Cl.$^7$ .................................................. B60R 13/04
(52) U.S. Cl. .................... 428/156; 428/198; 296/208; 277/644; 277/650; 277/654
(58) Field of Search .................................. 296/208, 210, 296/213; 49/490.1, 489.1; 277/642, 644, 650, 654; 428/156, 198

(56) References Cited

U.S. PATENT DOCUMENTS

| | | | |
|---|---|---|---|
| 3,018,262 | 1/1962 | Schroeder | 260/29.2 |
| 3,117,099 | 1/1964 | Proops et al. | 260/18 |
| 3,837,984 | * 9/1974 | Wagner et al. | 161/53 |
| 4,366,196 | 12/1982 | Maekawa et al. | 428/36 |
| 4,792,180 | 12/1988 | Jacobsen et al. | 296/213 X |
| 5,074,610 | 12/1991 | Tamura et al. | 296/208 X |
| 5,086,088 | 2/1992 | Kitano et al. | 522/170 |
| 5,089,536 | 2/1992 | Palazzotto | 522/16 |
| 5,126,188 | 6/1992 | Shimizu et al. | 428/215 |
| 5,223,106 | 6/1993 | Gerace et al. | 204/181.1 |
| 5,252,694 | 10/1993 | Willett et al. | 525/404 |
| 5,268,053 | * 12/1993 | Zoller | 156/242 |
| 5,326,605 | 7/1994 | Ono et al. | 428/40 |
| 5,340,946 | 8/1994 | Friedrich et al. | 174/256 |
| 5,407,978 | 4/1995 | Bymark et al. | 523/457 |
| 5,484,838 | 1/1996 | Helms et al. | 524/496 |
| 5,948,508 | * 9/1999 | Pastore et al. | 428/156 |

FOREIGN PATENT DOCUMENTS

| | | | |
|---|---|---|---|
| 12 91 221 B | 3/1969 | (DE) . | |
| 44 27 270 A | 2/1995 | (DE) . | |
| 94 19 781 U | 2/1995 | (DE) | B60R/13/06 |
| 19749547A1 | 11/1997 | (DE) . | |
| 0 392 847 A2 | 10/1990 | (EP) | B32B/27/00 |
| WO 92/20754 | 11/1992 | (WO) | C09J/163/00 |
| WO 94/21741 | 9/1994 | (WO) | C09J/7/00 |
| WO 95/13327 | 5/1995 | (WO) | C09J/4/06 |
| WO 96/10059 | 4/1996 | (WO) | C09J/5/08 |
| WO 96/16793 | * 6/1996 | (WO) . | |
| WO 96/32453 | * 10/1996 | (WO) . | |
| WO 99/08899 | 2/1999 | (WO) . | |

* cited by examiner

Primary Examiner—Blaine Copenheaver
Assistant Examiner—Alicia Chevalier
(74) Attorney, Agent, or Firm—Harold C. Knecht, III (57) ABSTRACT

An article adapted for sealing a discontinuity in a surface. The article includes a melt-flowable composition that flows and seals the discontinuity when the article is heated to a sufficient temperature and a polymeric cap controlling the melt-flow behavior of the melt-flowable composition to substantially confine the melt-flowable composition to the area underneath the cap, when the article is heated to a temperature sufficient to cause the melt-flowable composition to flow, and then cooled.

26 Claims, 4 Drawing Sheets

SEALING METHOD AND ARTICLE

This is a divisional of application Ser. No. 08/911,742 filed Aug. 15, 1997, now U.S. Pat. No. 5,964,979.

BACKGROUND OF THE INVENTION

This invention relates to sealing discontinuities, for example, of the type found in motor vehicles.

Motor vehicles such as automobiles and trucks have metal surfaces that are typically painted "on-line" using an electrostatic spray process. The paints used are relatively brittle because they are formulated to be hard, durable and to approximate the low coefficient of thermal expansion characteristic of metal surfaces.

These motor vehicles also have joints that must be sealed. One example is a generally non-planar overlap joint formed by welding together the roof and side panel of the vehicle to create a U-shaped trough called a roof ditch. Water collects in the roof ditch and then is drained away from the vehicle.

To prevent water from seeping through the joint it is necessary to seal it. It is often difficult to obtain a good seal, however, because the joint is not planar. In addition, the width of the roof ditch typically varies along its length, further complicating the ability to provide a good seal.

In practice, roof ditch joints are typically sealed using a paste-like plastisol which is then painted, baked and cooled to room temperature. The surface of the sealant may be covered with a plastic or rubber molding having a flexible top surface, which molding may be painted, for example to match or complement the color of the vehicle exterior. Alternatively, a metal molding may be used. The molding is typically attached to the sealant surface using a mechanical fastener or a pressure sensitive adhesive.

The plastic or rubber molding cannot be painted "on-line" along with the rest of the vehicle because the brittle, electrostatically applied paint will crack and flake off the surface owing to poor adhesion and a mismatch in the coefficients of thermal expansion between the molding surface and the paint. Therefore, the plastic or rubber molding is painted "off-line" in a separate operation using specially formulated paints.

SUMMARY OF THE INVENTION

In one aspect, the invention features a method and an article for sealing a discontinuity in the surface of a substrate. Examples of discontinuities include overlap seams or joints, butt seams or joints, depressions or indentations, holes, spot welds, and manufacturing defects. The method includes the steps of: (a) placing over the discontinuity an article that includes (i) a melt-flowable composition (i.e., a composition that exhibits mass flow upon heating) characterized by a first width, and (ii) a shaped, polymeric cap having a pre-selected, cross-sectional profile characterized by a second width, and a shape in which the thickness of the cap across its width, the width of the cap, or both the width and the thickness of the cap vary; (b) heating the article to cause the melt-flowable composition to flow and seal the discontinuity; and (c) allowing the article to cool while substantially retaining the pre-selected cross-sectional profile of the cap. The method is particularly useful for sealing seams or joints formed in the floor of a recessed area such as the roof ditch on a motor vehicle.

The cap controls the melt-flow behavior of the melt-flowable composition to substantially confine the melt-flowable composition to the area underneath the cap. To aid in accomplishing this purpose, it is generally preferred that the width of the cap exceed the width of the melt-flowable composition, a characteristic that relates to another aspect of the invention.

The shape of the cap is selected based upon the particular discontinuity which the article is designed to seal. A configuration particularly useful in the case of seams or joints formed in the floor of recesses such as motor vehicle roof ditches is one in which the cross-sectional profile is characterized by a pair of laterally extending, opposed extensions, at least one of which is tapered in the thickness direction. Preferably, both opposing extension portions are tapered in the thickness direction.

The cap is designed to substantially retain its shape during the melt-sealing operation. It may contain one or more layers of material. A preferred material for the cap is a B-staged thermosetting composition such as a B-staged epoxy-polyester blend. "B-staged" refers to an intermediate state in a thermosetting resin reaction in which the material softens when heated, and swells, but does not dissolve in certain liquids, as described in ASTM Standard D907-91b. Consequently, a B-staged material is partially cured (i.e., partially cross-linked) and dimensionally stable (i.e., it substantially retains it shape during the heat curing cycle of the melt-flowable composition, e.g., at about 110–200° C. for 20–40 minutes). Another suitable material is a thermoplastic composition having a high heat deflection temperature such as polyetheretherketone, polyphenyleneoxide, and polyesters such as polybutylene terephthalate and blends thereof with polycarbonates.

The stiffness of the article may be further enhanced by including a stiffening member such as a metal or a dimensionally stable plastic insert in the cap, in the melt-flowable composition, or between the cap and the melt-flowable composition.

The cap preferably includes a paint-receptive surface such that it can be painted either following cooling or prior to heating. Preferably, the paint-receptive surface is paintable to a substantially Class A finish. A "substantially Class A finish" is an exterior finish, particularly of the type found in the automotive industry, that is substantially free from pits, porosity and swirls. In this way, both sealing and painting can be accomplished in a single operation. Preferably, the paint-receptive surface is sufficiently electrically conductive to permit the cap to be electrostatically painted. In this way, in the case of motor vehicle manufacture, the molding can be painted "on-line" along with the rest of the vehicle.

A variety of melt-flowable compositions can be used. Examples of preferred compositions include semi-crystalline, thermosetting epoxy-polyester blends, thermosetting epoxy-acrylate blends, and thermosetting ethylene vinyl acetate-elastomer blends. The composition may include one or more melt-flowable layers, and may be covalently bonded to the cap.

In a different aspect, the invention features a method for sealing a discontinuity in the surface of a substrate in which a sealant and a cap are provided separately. The method includes steps of: (a) placing a sealant composition over the discontinuity; (b) placing over the composition a shaped, polymeric cap having a pre-selected, cross-sectional profile in which the thickness of the cap across its width, the width of the cap, or both the width and the thickness of the cap vary; (c) heating the sealant composition to cause the composition to seal the discontinuity; and (d) allowing the composition and the cap to cool while substantially retaining the pre-selected cross-sectional profile of said cap. The cap controls the behavior of the composition to substantially confine the sealant to the area underneath the cap. Examples of suitable sealants include the above-described melt-flowable materials, as well as conventional sealants such as urethanes and polyvinyl chloride plastisols.

In other aspects, the invention features a shaped, electrostatically paintable, preferably B-staged, polymeric cap having a pre-selected, cross-sectional profile in which the thickness of the cap across its width, the width of the cap, or both the width and the thickness of the cap vary, said cap substantially retaining its profile upon exposure to temperatures of at least about 110° C., and, more preferably, temperatures encountered during an automotive paint-bake cycle. In addition to sealing applications, the cap may be used in applications involving motor vehicle body side moldings and decorative moldings. In such applications, the cap is combined with a bonding material such as a pressure sensitive adhesive, e.g., in the form of a tape such as Structural Bonding Tape No. 9245 commercially available from 3M Company, St. Paul, Minn.

The invention simplifies vehicle manufacture by providing, in a single, readily-handled article, a combination of a sealant and a shaped polymeric cap having a surface that can be painted "on-line" in an assembly plant using the same brittle, low elongation paints used to paint other vehicle parts made of metal. The invention thus eliminates the need for a separate, "off-line" painting operation to paint the molding, thereby saving time, space and money. The ability to paint the molding "on-line" also eliminates the need for maintaining a costly inventory of pre-painted, color-matched moldings. In addition, by rendering the surface of the article electrically conductive, the article can be painted electrostatically. Electrostatic painting results in less wasted paint because the paint is attracted directly to the target surface. The cap further facilitates painting because the composition for the cap can advantageously be formulated to contain functional groups that can react with the paint to bond the paint to the target surface.

The shape of the article can be tailored to match the contours of the discontinuity over which the article is designed to be placed. By adjusting the shape so that the article fits securely over the discontinuity before, during and after heating, it is possible to contain the sealant as it flows, thereby minimizing the occurrence of gaps in the sealed area that could lead to leaks. Visual defects such as bumps, ridges, ripples and other irregularities that could otherwise mar the aesthetics of the final surface of the sealed area are also minimized.

The use of a pre-shaped cap that resists flow (and thus dimensional change) during heating also makes it possible to design a molding with certain surface features or shapes that are preserved during heating, rather than relying on mass flow during a paint-bake operation to achieve a desired appearance.

Other features and advantages of the invention will be apparent from the following description of the preferred embodiments and from the claims.

BRIEF DESCRIPTION OF THE DRAWINGS

The invention will be more fully appreciated with reference to the following drawings in which similar reference numerals designate like or analogous components throughout and in which.

DETAILED DESCRIPTION OF THE PREFERRED EMBODIMENTS

Article

Figure 1:
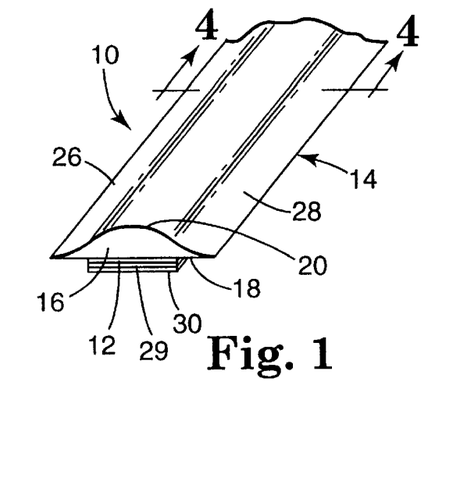
FIG. 1 is a partial perspective view of one embodiment of an article according to the invention.

Turning now to the drawings, FIG. 1 illustrates a paintable article 10 according to the invention. Paintable article 10 is particularly useful for sealing discontinuities such as joints and seams formed in the floors of recessed areas such as motor vehicle roof ditches. Article 10 comprises a melt-flowable sealant composition 12, and a paintable, melt flow-resistant, shaped polymeric cap 14 having a pre-selected, cross-sectional profile in which the thickness of the cap across its width, the width of the cap, or both the thickness and the width of the cap are intentionally varied so as to have a cross-sectional shape that is other than square or rectangular. Given the relative size of the articles of the invention, it will be appreciated that the variation in the thickness and/or width of the cap is on a scale that is easily visible to the unaided human eye.

For those applications in which the article is intended to seal an elongate discontinuity (such as motor vehicle roof ditch joints and seams), the article preferably has an elongate shape and preferably has a length that is at least substantially equal to the length of the discontinuity that is to be sealed. The article may be longer than the discontinuity if one or both ends of the article are intended to be tucked underneath structural or decorative elements adjacent to the discontinuity such as, in the case of motor vehicles, a window, a window surround, or a body panel. The article may have a length that is less than the length of the discontinuity that is to be sealed, depending upon the particular application. While it is preferred for the article to be provided as a continuous member for sealing the discontinuity, the article may be provided as a plurality of discrete segments that can be arranged in an essentially continuous fashion to seal the discontinuity.

Cap 14 includes a central body portion 16 that is defined by a first, lower or inner surface 18, and a second, upper or outer surface 20. Lower surface 18 may be an essentially planar continuous surface, which is useful in promoting good adhesion to sealant 12. Alternatively, however, lower surface 18 may be provided with a seat, channel or groove 22 (FIG. 2), or one or more pockets 24 (FIG. 3) adapted to receive the sealant.

Outer surface 20 may be readily formed into a variety of contours depending upon the aesthetic and functional desires for a particular application. For example, the outer surface may be provided, as shown in FIG. 1, with a convex profile which, for example, is useful in channeling water run-off to the sides of a roof ditch and preventing the accumulation of standing water. In certain instances, however, it may be desirable to provide outer surface 20 with a concave profile so as to, for example, reduce the possibility of water seeping between the edge of article 10 and the walls of the roof ditch or to aid in channeling water run-off toward the front or the rear of the vehicle. Outer surface 20 may also be formed in an essentially flat configuration that is oriented in any plane.

With continued reference to FIG. 1, cap 14 further includes a pair of opposed, laterally extending wings or extension portions 26 and 28 which extend longitudinally for substantially the length of the body portion and provide an intentional variation in both the thickness and the width of the cap. Advantageously, as explained more fully below, the extension portions engage the interior surfaces of the recess side walls to secure the article within the recess and to bond the article to the recess side walls. Preferably, extension portions 26 and 28 merge smoothly with the body portion's outer surface 20, form an essentially continuous uninterrupted surface with the body portion's lower surface 18, and taper in the thickness direction away from the body portion. The tapered extension portions are also helpful in providing a clean, aesthetically pleasing transition between article 10 and the interior surfaces of the recess side walls along the length of the recess into which the article is placed.

A strip of bonding material 29, e.g., in the form of a pressure sensitive adhesive, may optionally be applied to the bottom of melt-flowable sealant 12 to adhere article 10 directly to the area to be sealed. Bonding material 29 may be protected from dirt and other contaminants by a temporary liner 30, for example, a paper or polymeric film that has been coated with a release material such as polyethylene, a silicone or a fluoro-silicone. Liner 30 is easily removed prior to installing article 10. Preferably, however, article 10 is placed over the joint such that it bridges the joint, thereby eliminating the need for a separate bonding material.

Figure 2:
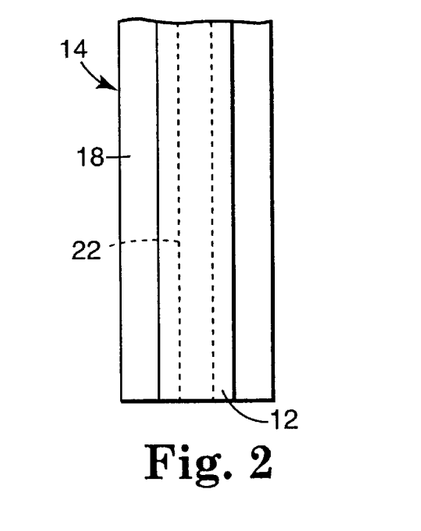
FIG. 2 is a partial bottom plan view of another embodiment of an article according to the invention and showing a channel formed in a lower surface of the cap for the article.
Figure 3:
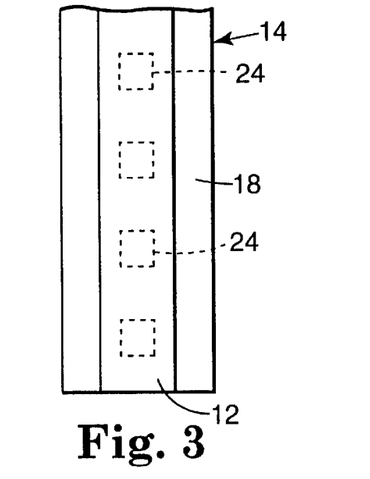
FIG. 3 is a partial bottom plan view of a different embodiment of an article according to the invention and showing pockets formed in a lower surface of the cap for the article.
Figure 4:
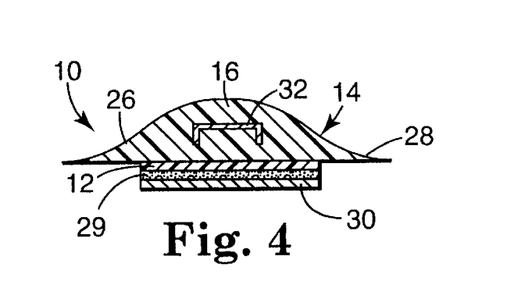
FIG. 4 is an enlarged cross-sectional view taken along lines 4—4 in FIG. 1.

While the invention has been described with particular reference to the embodiments shown in FIGS. 1 to 3, it will be understood that article 10 may be usefully modified in a variety of other ways, and such embodiments are also within the scope of this invention. For example and with reference to FIG. 4, article 10 may optionally include a stiffening member 32 inserted within the body portion of cap 14 to reinforce and stiffen article 10. The stiffening member may be formed from metal or from a dimensionally stable plastic, and can assume a variety of shapes beyond the U- or channel-shape that is illustrated, such as a bar- or an L-shape. Alternatively, the stiffening member may be inserted within the melt-flowable composition, or between the cap and the melt-flowable composition.

Figure 5:
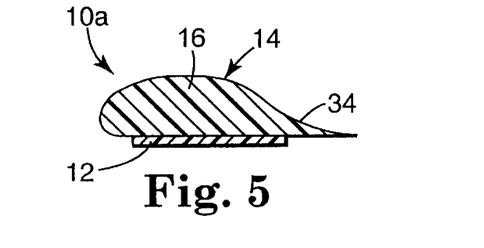
FIG. 5 is an enlarged cross-sectional view similar to FIG. 4, but showing an embodiment in which an extension portion is provided along only one longitudinal edge of the body portion of the article cap, and with the optional stiffening member, bonding material, and temporary liner having been removed for clarity.

As best shown in FIG. 5, the invention also pertains to a paintable article 10a that comprises a melt-flowable sealant 12, and a paintable, melt flow-resistant, shaped polymeric cap 14 having a pre-selected, cross-sectional profile with an extension portion 34 along only one longitudinal edge of body portion 16. Extension portion 34 tapers in the thickness direction away from body portion 16. Articles of the type illustrated in FIG. 5 are particularly well adapted for placement in L-shaped, as opposed to U- or channel-shaped, recesses, extension portion 34 extending outwardly from the side wall.

Figure 6:
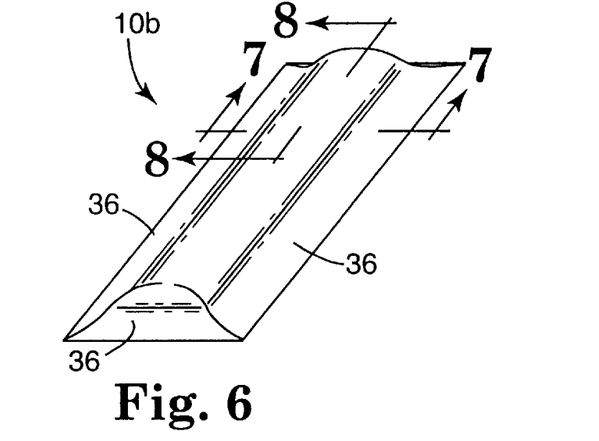
FIG. 6 is a partial perspective view of a different embodiment of an article according to the invention and in which an extension portion circumscribes the body portion of the article cap.
Figure 7:
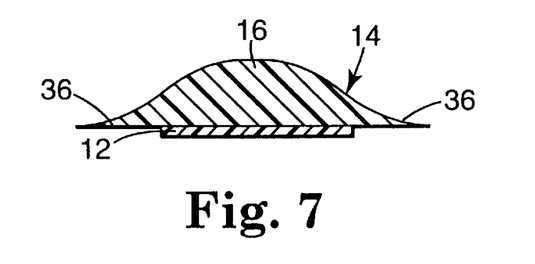
FIG. 7 is an enlarged cross-sectional view taken along lines 7—7 in FIG. 6.
Figure 8:
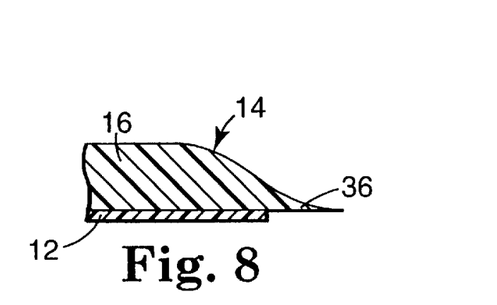
FIG. 8 is an enlarged cross-sectional view taken along lines 8—8 in FIG. 6.

In another embodiment, which is illustrated in FIGS. 6 to 8, the invention includes a paintable article 10b that comprises a melt-flowable sealant 12, and a paintable, melt flow-resistant, shaped polymeric cap 14 with an extension portion 36 that circumscribes the perimeter of body portion 16 and which tapers in the thickness direction away from the body portion. Such constructions are especially useful if the longitudinal end portions of the article will remain exposed or if the longitudinal end portions will be tucked underneath a structural or decorative member that is adjacent to the discontinuity that is to be sealed.

Figure 9:
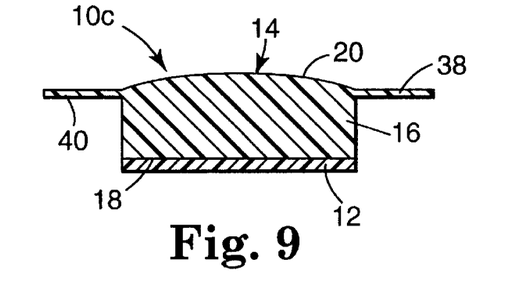
FIG. 9 is an enlarged cross-sectional view similar to FIG. 4 but showing an embodiment with different extension portions, and with the optional stiffening member, bonding material, and temporary liner having been removed for clarity.

FIG. 9 describes an embodiment of the invention in which a paintable article 10c comprises a melt-flowable sealant 12, and a paintable, melt flow-resistant, shaped polymeric cap 14. Extension portions 38 and 40, while merging smoothly with upper surface 20 of body portion 16 do not form an essentially continuous uninterrupted surface with the body portion's lower surface 18. Extension portions 38 and 40 join body portion 16 intermediate the upper and lower surfaces at preferably a right angle, although they may join the body portion at an oblique angle. The angle determines the amount of force needed to push the article into the discontinuity; angles closer to a right angle require more force. Embodiments of the type shown in FIG. 9 are useful in conjunction with discontinuities that are formed in deep recesses. FIG. 9 also illustrates that extension portions associated with caps used in the practice of the invention are not required to taper in the thickness direction and may, instead, have an essentially uniform thickness along their length, while still providing an intentional variation in both the thickness and the width of the cap. Extension portions of the type shown in FIG. 9 may be used in conjunction with the other embodiments of the cap described herein. Of course, extension portions that taper in the thickness direction may also be used in conjunction with the embodiment shown in FIG. 9 as well as the other embodiments.

Figure 10:
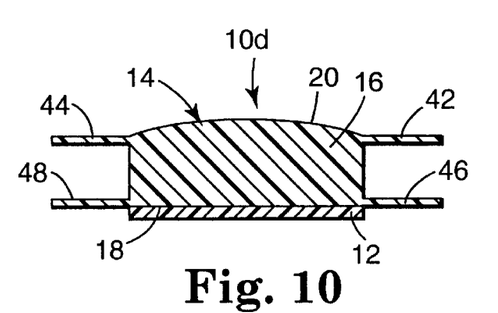
FIG. 10 is an enlarged cross-sectional view similar to FIG. 9 but showing another embodiment with different extension portions.

FIG. 10 illustrates yet another embodiment of the invention in which a paintable article 10d comprises a melt-flowable sealant 12, and a paintable, melt flow-resistant, shaped polymeric cap 14. This embodiment, however, includes two pairs of extension portions, 42, 44 and 46, 48, respectively. Extension portions 42 and 44 are similar to extension portions 38 and 40 described in conjunction with FIG. 9. Extension portions 46 and 48 preferably form an essentially continuous uninterrupted surface with lower surface 18 of body portion 16, and join the body portion intermediate the upper and lower surfaces at preferably a right angle, although they may join the body portion at an oblique angle. Embodiments of the type shown in FIG. 10 are useful in conjunction with recesses for which additional frictional engagement of the paintable article with the recess side walls is desirable due to, for example, variations in the width of the recess along its length. Embodiments of the type shown in FIG. 10 are also useful in conjunction with recesses where additional bonding and sealing strength to the recess may be desired in the final vehicle construction.

Figure 11:
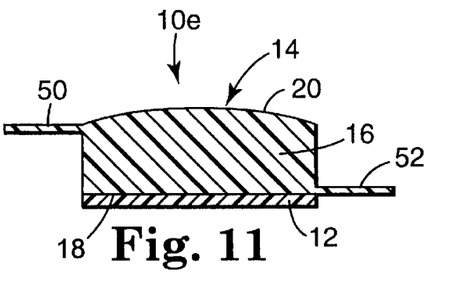
FIG. 11 is an enlarged cross-sectional view similar to FIG. 9 but showing a further embodiment with different extension portions.

FIG. 11 shows still a further embodiment of the invention in which a paintable article 10e comprises a melt-flowable sealant 12, and a paintable, melt flow-resistant, shaped polymeric cap 14. Extension portion 50 merges smoothly with upper surface 20 of body portion 16 but does not form an essentially continuous uninterrupted surface with the body portion's lower surface 18. Extension portion 50 joins body portion 16 intermediate the upper and lower surfaces at preferably a right angle, although it may join the body portion at an oblique angle. Extension portion 52 preferably forms an essentially continuous uninterrupted surface with lower surface 18 of body portion 16, and joins the body portion intermediate the upper and lower surfaces at preferably a right angle, although it may join the body portion at an oblique angle. Embodiments of the type shown in FIG. 11 are useful in conjunction with recesses in which there is only a single side wall or the two side walls are skewed with respect to each other, e.g., see FIGS. 14 and 15.

Although both melt-flowable sealant 12 and cap 14 are shown in the FIGS. as single-layer constructions, each may include multiple layers, as explained in greater detail below. To minimize cracking due to differences in the coefficients of thermal expansion between the cap and the melt-flowable sealant, the melt-flowable sealant is preferably covalently bonded to the cap.

Articles according to the invention are advantageously designed to fit securely within a recessed area such as a roof ditch both before, during and after heating at temperatures typically encountered during motor vehicle sealing, painting, and post-paint baking operations. In particular, the shape of cap 14 is selected to enable it to engage the interior surfaces of the side walls of the recess into which article 10 is placed, e.g., by bonding to these surfaces, the specific shape being selected based upon the contours of the recess.

To ensure a good, snug fit within the recess, and thereby prevent article 10 from shifting during heating as the melt-flowable sealant flows, the width of cap 14 preferably is greater than the width of melt-flowable sealant 12 and those portions of the cap that extend beyond the melt-flowable sealant engage the recess. This feature forces the extension portions flush against the interior surfaces of the recess side walls, thereby securing the article in place. Forcing the extension portions against the recess side walls also contributes to a smooth, aesthetically pleasing transition between the article and the recess side walls. Preferably, the width of the melt-flowable composition is substantially the same as the width of the body portion of the cap.

The polymeric cap and the melt-flowable sealant composition will now be described in more detail.

Polymeric Cap

Cap 14 applies pressure to the melt-flowable composition upon heating to cause the melt-flowable composition to flow and seal the joint, while confining the composition to the area underneath the cap. Thus, the cap prevents the melt-flowable composition from spilling over the sides of the recess and/or becoming objectionally visible. In addition, cap 14 prevents entrapped air from percolating through the surface of the melt-flowable composition during heating. Such air bubbles can lead to unsightly bumps, ridges and ripples in the final surface of the molding which can cause paint that is applied to the cap surface to crack or to become so thin that the paint loses its ability to camouflage the surface.

Another function of cap 14 is to provide a paintable surface. Preferably, cap 14 includes an electrically conductive material such as carbon black, metal particles or whiskers, or metal-clad glass or polymeric particles to render the cap sufficiently electrically conductive that it can be electrostatically painted. In addition, the concentration is below the point at which the electrically conductive agent would impair the ability of the cap to cure. Typical concentrations of electrically conductive material are in the range of about 1–20% by weight based upon the total weight of the cap composition. Alternatively, the outer surface of cap 14 may be provided with an electrically conductive coating such as a vapor-coated metal. Because cap 14 can be designed to engage the interior surfaces of the recess side walls such that gap formation is minimized, the Faraday Cage effect associated with electrostatic painting can be minimized.

Cap 14 is preferably made from a thermosettable composition that can be thermoformed, e.g., through extrusion or injection molding, into a desired shape. In the course of the thermoforming process, the thermosettable composition is B-staged. Alternatively, the composition can be thermoformed and then B-staged in a separate operation, or it can be B-staged and then thermoformed. The resulting B-staged material is a relatively rigid, shaped molding that resists mass flow (and thus dimensional change) when exposed to melt-sealing, painting, and post-bake temperatures encountered during the manufacture of motor vehicles. The B-staged composition, however, is sufficiently conformable and pliable to enable article 10 to be placed over the joint to be sealed in such a way that cap 14 bridges the joint and holds article 10 in place before, during, and after processing. Conformability and pliability are enhanced by including crystalline or semi-crystalline constituents in the composition such that the composition can soften during processing to bond cap 14 to the interior surfaces of the recess, without resulting in macroscopic mass flow of the cap as a whole, thereby enabling the cap to substantially retain its shape.

Suitable thermosetting compositions for cap 14 that meet these criteria include thermosettable materials such as epoxy resins, or blends of such materials with thermoplastic materials. An example of a useful blend is a B-staged version of the hot melt epoxy-polyester blends described in Johnson et al., "Melt-Flowable Materials and Method of Sealing Surface," filed Apr. 12, 1995 and bearing Ser. No. 08/421,055, which is assigned to the same assignee as the present application and hereby incorporated by reference. These compositions are melt-flowable (and thus thermoformable) in the uncured state, but resist mass flow once they have been B-staged. They feature an epoxy-containing material blended with a semi-crystalline polyester resin. The epoxy-containing material contributes to the ultimate strength and heat resistance of the composition, while the polyester component provides conformability and pliability. An initiator such as a photo- or thermal initiator may also be included to permit the composition to cure (i.e., covalently cross-link) upon exposure to an appropriate energy source such as thermal or actinic radiation. Examples of suitable actinic radiation sources include ultraviolet, visible-ultraviolet, and electron beam radiation sources.

Preferred polyesters are hydroxyl-terminated and carboxyl-terminated polyesters that are semi-crystalline at room temperature. The hydroxyl (—OH) and carboxyl (—COOH) groups subsequently promote paint adhesion because they form covalent bonds with conventionally used paint products. Other functional groups that promote paint adhesion include —NH, —CONH, —NH$_2$, —SH, anhydride, urethane, and oxirane groups.

A material that is "semi-crystalline" displays a crystalline melting point, as determined by differential scanning calorimetry (DSC), preferably with a maximum melting point of about 200° C. Crystallinity in a polymer is also observed as a clouding or opacifying of a sheet that had been heated to an amorphous state as it cools. When the polyester polymer is heated to a molten state and knife coated onto a liner to form a sheet, it is amorphous and the sheet is observed to be clear and fairly transparent to light. As the polymer in the sheet material cools, crystalline domains form and the crystallization is characterized by the clouding of the sheet to a translucent or opaque state. The degree of crystallinity may be varied in the polymers by mixing in any compatible combination of amorphous polymers and semi-crystalline polymers having varying degrees of crystallinity. It is generally preferred that material heated to an amorphous state be allowed sufficient time to return to its semi-crystalline state before painting so that the paint is applied to a uniformly consistent surface. The clouding of the sheet provides a convenient non-destructive method of determining that crystallization has occurred to some degree in the polymer.

The polymers may include nucleating agents to increase the rate of crystallization at a given temperature. Useful nucleating agents include microcrystalline waxes. A suitable wax is, for example, sold by Petrolite Corp. as Unilin™ 700. Paint catalysts such as para-toluene sulfonic acid may be added to the polyester, as well as melamines to improve the adhesion of the composition to paint and coatings.

The preferred polyesters are solid at room temperature. Preferred polyester materials have a number average molecular weight of about 7500 to 200,000, more preferably from about 10,000 to 50,000, and most preferably, from about 15,000 to 30,000.

Polyester components useful in the invention comprise the reaction product of dicarboxylic acids (or their diester equivalents, including anhydrides) and diols. The diacids (or diester equivalents) can be saturated aliphatic acids containing from 4 to 12 carbon atoms (including branched, unbranched, or cyclic materials having 5 to 6 carbon atoms in a ring) and/or aromatic acids containing from 8 to 15 carbon atoms. Examples of suitable aliphatic acids are succinic, glutaric, adipic, pimelic, suberic, azelaic, sebacic, 1,12-dodecanedioic, 1,4-cyclohexanedicarboxylic, 1,3-cyclopentanedicarboxylic, 2-methylsuccinic, 2-methylpentanedioic, 3-methylhexanedioic acids, and the like. Suitable aromatic acids include terephthalic acid, isophthalic acid, phthalic acid, 4,4'-benzophenone dicarboxylic acid, 4,4'-diphenylmethanedicarboxylic acid, 4,4'-diphenylthioether dicarboxylic acid, and 4,4'-diphenylamine dicarboxylic acid. Preferably the structure between the two carboxyl groups in the diacids contain only carbon and hydrogen, and more preferably, the structure is a phenylene group. Blends of the foregoing diacids may be used.

The diols include branched, unbranched, and cyclic aliphatic diols having from 2 to 12 carbon atoms. Examples of suitable diols include ethylene glycol, 1,3-propylene glycol, 1,2-propylene glycol, 1,4-butanediol, 1,3-butanediol, 1,5-pentanediol, 2-methyl-2,4-pentanediol, 1,6-hexanediol, cyclobutane-1,3-di(2'-ethanol), cyclohexane-1,4-dimethanol, 1,10-decanediol, 1,12-dodecanediol, and neopentyl glycol. Long chain diols including poly(oxyalkylene) glycols in which the alkylene group contains from 2 to 9 carbon atoms, preferably 2 to 4 carbon atoms, may also be used. Blends of the foregoing diols may be used.

Useful commercially available hydroxyl terminated polyester materials include various saturated linear, semi-crystalline copolyesters available from Hüls America, Inc. such as Dynapol™ 1401, Dynapol™ 1402, Dynapol™ 1358, Dynapol™ 1359, Dynapol™ 1227, and Dynapol™ 1229. Useful saturated, linear amorphous copolyesters available from Hüls America, Inc., include Dynapol™ 1313 and Dynapol™ 1430.

Useful epoxy-containing materials are epoxy resins have at least one oxirane ring polymerizable by a ring opening reaction. Such materials, broadly called epoxides, include both monomeric and polymeric epoxides and can be aliphatic, cycloaliphatic, or aromatic. These materials generally have, on the average, at least two epoxy groups per molecule (preferably more than two epoxy groups per molecule). The "average" number of epoxy groups per molecule is defined as the number of epoxy groups in the epoxy-containing material divided by the total number of epoxy molecules present. The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The molecular weight of the epoxy-containing material may vary from 58 to about 100,000 or more. Mixtures of various epoxy-containing materials can also be used.

Useful epoxy-containing materials include those which contain cyclohexene oxide groups such as the epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexane carboxylate, and bis(3,4-epoxy-6-methylcyclohexylmethyl) adipate. For a more detailed list of useful epoxides of this nature, reference may be made to U.S. Pat. No. 3,117,099.

Further epoxy-containing materials which are particularly useful are glycidyl ether monomers such as glycidyl ethers of polyhydric phenols obtained by reacting a polyhydric phenol with an excess of chlorohydrin such as epichlorohydrin (e.g., the diglycidyl ether of 2,2-bis-(2,3-epoxypropoxyphenol) propane). Further examples of epoxides of this type which can be used in the practice of this invention are described in U.S. Pat. No. 3,018,262. Other useful glycidyl ether based epoxy-containing materials are described in U.S. Pat. No. 5,407,978.

There are a number of commercially available epoxy-containing materials which can be used. In particular, epoxides which are readily available include octadecylene oxide, epichlorohydrin, styrene oxide, vinyl cyclohexene oxide, glycidol, glycidylmethacrylate, diglycidyl ether of Bisphenol A (e.g., those available under the trade designations EPON 828, EPON 1004, and EPON 1001F from Shell Chemical Co., and DER-332 and DER-334, from Dow Chemical Co.), diglycidyl ether of Bisphenol F (e.g., ARALDITE GY281 from Ciba-Geigy), vinylcyclohexene dioxide (e.g., ERL 4206 from Union Carbide Corp.), 3,4- epoxycyclohexylmethyl-3,4-epoxycyclohexene carboxylate (e.g., ERL-4221 from Union Carbide Corp.), 2-(3,4-epoxycylohexyl-5,5-spiro-3,4-epoxy) cyclohexane-metadioxane (e.g., ERL-4234 from Union Carbide Corp.), bis(3,4-epoxycyclohexyl) adipate (e.g., ERL-4299 from Union Carbide Corp.), dipentene dioxide (e.g., ERL-4269 from Union Carbide Corp.), epoxidized polybutadiene (e.g., OXIRON 2001 from FMC Corp.), epoxy silanes (e.g., beta-(3,4-epoxycyclohexyl)ethyltrimethoxy silane and gamma-glycidoxypropyltrimethoxy silane, commercially available from Union Carbide), flame retardant epoxy resins (e.g., DER-542, a brominated bisphenol type epoxy resin available from Dow Chemical Co.), 1,4-butanediol diglycidyl ether (e.g., ARALDITE RD-2 from Ciba-Geigy), hydrogenated bisphenol A-epichlorohydrin based epoxy resins (e.g., EPONEX 1510 from Shell Chemical Co.), and polyglycidyl ether of phenolformaldehyde novolak (e.g., DEN-431 and DEN-438 from Dow Chemical Co.).

Useful photoinitiators are cationic and include aromatic iodonium complex salts, aromatic sulfonium complex salts, and metallocene salts, and are described in, for example, U.S. Pat. No. 5,089,536. Peroxides and oxalate esters can be used with the metallocene salts to increase the cure speed, as described in U.S. Pat. No. 5,252,694. Useful commercially available photoinitiators include FX-512, an aromatic sulfonium complex salt (3M Company), CD-1010 an aromatic sulfonium complex salt from Sartomer, CD-1012, a diaryl iodonium complex salt from Sartomer, an aromatic sulfonium complex salt (Union Carbide Corp.), UVI-6974, an aromatic sulfonium complex salt (Union Carbide Corp.), and IRGACURE 261, a metallocene complex salt (Ciba-Geigy). Photosensitizers may also be included, for example, to enhance the efficiency of the photoinitiator and/or to adjust the wavelength of photoactivity. Examples of photosensitizers include pyrene, fluoroanthrene, benzil, chrysene, p-terphenyl, acenaphthene, phenanthrene, biphenyl and camphorquinone.

A variety of thermally activated materials may also be incorporated into the compositions. For example, useful thermal initiators include amine, amide, imidazole, Lewis acid complex, and anhydride type materials. A hardener may be added to effect the curing of the epoxy-containing material under application of heat. The hardener may be any type, but preferably is an amine type hardener that is selected from the group comprising dicyandiamide, imidazoles and polyamine salts. These are available from a variety of sources, e.g., Omicure™, available from Omicron Chemical, Ajicure™, available from Ajinomoto Chemical, and Curezol™, available from Air Products.

In certain cases, it may be advantageous to add an accelerator to the cap composition, so that it will fully cure at a lower temperature, or will fully cure when exposed to heat for shorter periods. Imidazoles are useful, suitable examples of which include 2,4-diamino-6-(2'-methyl-imidazoyl)-ethyl-s-triazine isocyanurate; 2-phenyl-4-benzyl-5-hydoxymethylimidazole; and Ni-imidazole-phthalate.

Other useful blends for cap 14 include epoxy-acrylate blends. These blends are preferably the photopolymerized reaction product of a composition featuring (i) a prepolymeric (i.e., partially polymerized to a viscous syrup typically between about 100 and 10,000 centipoises) or monomeric syrup of an acrylic or methacrylic acid ester; (ii) optionally, a reinforcing comonomer; (iii) an epoxy resin; (iv) a photoinitiator; and (v) a heat activatable hardener for the epoxy. Blends of this type are described in Kitano et al., U.S. Pat. No. 5,086,088, incorporated herein by reference. Also useful is the thermally polymerized reaction product of a composition featuring (i) a prepolymeric (i.e., partially polymerized to a viscous syrup typically between about 100 and 10,000 centipoises) or monomeric syrup of an acrylic or methacrylic acid ester; (ii) optionally, a reinforcing comonomer; (iii) an epoxy resin; (iv) a thermal initiator; and (v) a photoactivatable hardener for the epoxy.

In the case of epoxy-acrylate and epoxy-polyester blends, the compositions typically include from 0.01 to 95 parts per 100 parts total of the epoxy-containing material and, correspondingly, from 99.99 to 5 parts of the polyester or acrylate component. More preferably, the compositions include from 0.1 to 80 parts of the epoxy-containing material and, correspondingly, from 99.9 to 20 parts of the polyester or acrylate component. Most preferably, the compositions include from 0.5 to 60 parts of the epoxy-containing material, and, correspondingly, from 99.5 to 40 parts of the polyester or acrylate component.

Also suitable are epoxy-acrylate-polyester blends. The epoxy-polyester-polyacrylate compositions include an epoxy resin as described above, a thermoplastic polyester component as described above, a polyfunctional acrylate component, a curative for the epoxy resin, and an initiator for the polyfunctional acrylate portion of the formulation that permits the composition to cure upon exposure to energy, which initiator is optional unless a thermal curative for the epoxy resin is employed.

The "polyfunctional acrylate" component means ester compounds which are the reaction product of aliphatic polyhydroxy compounds and (meth)acrylic acids. The aliphatic polyhydroxy compounds include compounds such as (poly)alkylene glycols and (poly)glycerols. Polyfunctional acrylates can be a monomer, an oligomer or mixtures of monomer and/or oligomer, although monomeric polyfunctional acrylate components are preferred. Representative polyfunctional acrylate monomers include ethylene glycol diacrylate, ethylene glycol dimethacrylate, hexanediol diacrylate, triethylene glycol diacrylate, trimethylolpropane triacrylate, ethoxylated trimethylolpropane triacrylate, glycerol triacrylate, pentaerthyitol triacrylate, pentaerythritol trimethacrylate, pentaerythritol tetraacrylate, pentaerythritol tetramethacrylate, and neopentylglycol diacrylate. The term "acrylate" encompasses acrylates and methacrylates.

Useful commercially available polyfunctional acrylates include a trimethylolpropane triacrylate having the trade designation "SR351," an ethoxylated trimethylolpropane triacrylate having the trade designation "SR454," a pentaerythritol tetraacrylate having the trade designation "SR295," and a neopentylglycol diacrylate having the trade designation "SR247," and all of these being commercially available from Sartomer Co., Exton, Pa. Useful polyfunctional acrylate oligomers include commercially available polyether oligomers such as polyethylene glycol 200 diacrylate having the trade designation "SR259" and polyethylene glycol 400 diacrylate having the trade designation "SR344," both being commercially available from Sartomer Co., Exton, Pa. Other oligomers include acrylated epoxies such as diacrylated esters of epoxy resins, e.g., diacrylated esters of bisphenol A epoxy resin. Examples of commercially available acrylated epoxies include epoxies available under the trade designations "CMD 3500," "CMD 3600," and "CMD 3700," from Radcure Specialties.

A useful formulation comprises, per 100 parts by weight: (a) about 5 to 75 parts by weight of the epoxy resin; (b) about 5 to 94 parts by weight of the polyester component; (c) about 0.1 to 20 parts by weight of the polyfunctional acrylate component; (d) about 0.1 to 4 parts by weight epoxy photocatalyst (or an effective amount of an epoxy thermal curative); (e) about 0 to 4 parts by weight epoxy accelerator; and (f) about 0 to 5 parts by weight free radical photoinitiator.

In the case of the free radical curable polyfunctional acrylate component, a free radical initiator preferably is added in an amount of 0.1 to 3.0% by weight, based on the total amount of resinous components. Examples of useful photoinitiators include organic peroxides, azo compounds, quinones, benzophenones, nitroso compounds, acyl halides, hydrazones, mercapto compounds, pyrylium compounds, triacylimidazoles, acylphosphine oxides, bisimidazoles, chloroalkyltriazines, benzoin ethers, benzil ketals, thioxanthones, and acetophenone derivatives, and mixtures thereof.

The epoxy-polyester-polyacrylate compositions may be prepared by mixing the various ingredients in a suitable vessel at an elevated temperature sufficient to liquify the materials so that they may be efficiently mixed with stirring but without thermally degrading them until the components are thoroughly melt blended. This temperature depends in part upon the particular chemistry. For example, this temperature may range from about 30 to 150° C., typically 50 to 130° C., and preferably ranges from 60 to 120° C. The components may be added simultaneously or sequentially, although it is preferred to first blend the solid epoxy resin and the polyester component followed by the addition of the polyfunctional acrylate, liquid epoxy resin and any hydroxyl-containing material. Then, the photoinitiator and photocatalyst are added followed by any optional additives including fillers.

Cap 14 may also be formed from a thermoplastic composition having a relatively high beat deflection temperature (e.g., on the order of about 110° C. or more), as measured by ASTM Standard D648-96, "Standard Test Method for Deflection Temperature of Plastics Under Flexural Load." Examples of suitable thermoplastic compositions include polyetheretherketone, polyphenyleneoxide, and polyesters such as polybutylene terephthalate and blends thereof with polycarbonates. To enhance stiffness, the thermoplastic composition may be fiber-reinforced, e.g., with glass fibers. Examples of suitable commercially available thermoplastic compositions are: Valox™ 420SEO-8051, a 30% by weight glass reinforced polybutylene terephthalate resin commercially available from General Electric Plastics of Pittsfield, Mass.; and other thermoplastic resins available from General Electric Plastics under the tradenames Valox™ (400, 500, 600, 700 and 800 series), Ultem™ (1000 series), Xenoy™ (2000 and 6000 series), Cycoloy™ and Lexan™.

Cap 14 may be formed of a single layer, or may include multiple layers. An advantage of using multiple layers is that the modulus of each individual layer can be tailored to create a gradient throughout the thickness of the cap, with the lowest modulus material (and thus the most flexible material) being next to melt-flowable composition 12, and the highest modulus composition forming the exposed surface layer of the cap. This gradient helps to minimize cracking and surface defect formation. In the case of multi-layer constructions incorporating an electrically conductive agent, the agent is preferably included in the exposed surface layer.

The exposed surface of cap 14 may be tailored to achieve a particular design requirement. For example, if it is desired to conceal the presence of the molding, a smooth surface may be desirable. On the other hand, the surface of cap 14 can be textured to highlight its presence.

Melt-Flowable Composition

The purpose of melt-flowable composition 12 is to form a protective seal over a discontinuity such as a joint or seam to prevent, e.g., water, dirt, snow, etc. from entering the discontinuity and causing corrosion. Composition 12 is preferably solid and substantially tack-free at room temperature. However, when placed over the joint and heated (typically, to a temperature of at least 50° C.), it first softens and conforms to the surface of the discontinuity, thereby pushing out trapped air. Further into the heating cycle, as the composition becomes hotter, it becomes tacky,,and bonds to the surface. The composition may be thermoplastic, such that upon re-heating, it flows again, or thermosetting, such that it crosslinks during heating and resists flowing following cooling and re-heating.

Examples of suitable melt-flowable compositions include the aforementioned epoxy-acrylate blends and epoxy-polyester blends in the absence of B-staging. Alternatively, epoxy resins may be blended with ethylene/acrylic acid or thermoplastic elastomers such as block copolymers of arenyl materials (e.g., styrene) and elastomeric materials (e.g., isoprene, butadiene and their saturated counterparts). Other examples include blends of acrylates or methacrylates and thermosetting resins such as urethane resins and phenolic resins. Another class of useful compositions includes blends of ethylene vinyl acetate and elastomers such as polybutadiene rubber. Commercially available examples of such compositions include L-3034 sealant (L&L Products, Romeo, Mich.) and Orbseal 124.5 (Orbseal, Inc., Excelsior Springs, Mo.).

In the case of epoxy blends, the melt-flowable compositions typically include from 0.01 to 95 parts per 100 parts total of the epoxy-containing material and, correspondingly, from 99.99 to 5 parts of the polyester or acrylate component. More preferably, the melt-flowable compositions include from 0.1 to 80 parts of the epoxy-containing material and, correspondingly, from 99.9 to 20 parts of the polyester or acrylate component. Most preferably, the compositions include from 0.5 to 60 parts of the epoxy-containing material, and, correspondingly, from 99.5 to 40 parts of the polyester or acrylate component. Increasing amounts of the epoxy-containing material relative to the polyester or acrylate component generally result in melt-flowable compositions having higher ultimate strength and heat resistance but less flexibility, and lower viscosity. Increasing amounts of the polyester or acrylate component generally result in melt-flowable compositions having lower ultimate strength, heat resistance and higher viscosity but greater flexibility and green strength build-up. Thus, the relative amounts of these ingredients are balanced depending on the properties sought in the final composition.

Other ingredients that may be included in the melt-flowable composition are hydroxyl-containing materials of the type described in the aforementioned Johnson patent application. Such materials are particularly useful in tailoring the flexibility of the composition. As the equivalent weight of the hydroxyl-containing material increases, the flexibility of the melt-flowable composition correspondingly increases, although there may be a consequent loss in cohesive strength. Similarly, decreasing equivalent weight may result in a loss of flexibility with a consequent increase in cohesive strength. Thus, the equivalent weight of the hydroxyl-containing material is selected so as to balance these two properties, the appropriate balance depending on the particular application.

The hydroxyl-containing material may be any liquid or solid organic material having hydroxyl functionality of at least 1, preferably at least 2, and most preferably about 3. The hydroxyl-containing organic material should be free of other "active hydrogen" containing groups such as amino and mercapto moieties. The hydroxyl-containing organic material should also be substantially free of groups which may be thermally or photolytically unstable so that the material will not decompose or liberate volatile components at temperatures below about 100° C. or when exposed to actinic or electron beam radiation during curing.

Representative examples of suitable organic materials having a hydroxyl functionality of 1 include alkanols, monoalkyl ethers of polyoxyalkylene glycols, and monoalkyl ethers of alkylene glycols.

Representative examples of useful monomeric polyhydroxy organic materials include alkylene glycols (e.g., 1,2-ethanediol, 1,3-propanediol, 1,4-butanediol, 2-ethyl-1,6-hexanediol, bis(hydroxymethyl)cyclohexane, 1,18-dihydroxyoctadecane, and 3-chloro-1,2-propanediol), polyhydroxyalkanes (e.g., glycerine, trimethylolethane, pentaerythritol, and sorbitol) and other polyhydroxy compounds such as N,N-bis(hydroxyethyl)benzamide, 2-butene-1,4-diol, castor oil, etc.

Representative examples of useful polymeric hydroxyl-containing materials include polyoxyalkylene polyols (e.g., polyoxyethylene and polyoxypropylene glycols and triols of equivalent weight of 31 to 2250 for the diols or 80 to 350 for triols), polytetramethylene oxide glycols of varying molecular weight, hydroxyl-terminated polyesters, and hydroxyl-terminated polylactones.

Useful commercially available hydroxyl-containing materials include the POLYMEG series (available from QO Chemicals, Inc.) of polytetramethylene oxide glycols such as POLYMEG 650, 1000 and 2000; the TERATHANE series (from E.I. duPont de Nemours and Company) of polytetramethylene oxide glycols such as TERATHANE 650, 1000 and 2000; POLYTHF, a polytetramethylene oxide glycol from BASF Corp.; the BUTVAR series (available from Monsanto Chemical Company) of polyvinylacetal resins such as BUTVAR B-72A, B-73, B-76, B-90 and B-98; the TONE series (available from Union Carbide) of polycaprolactone polyols such as TONE 0200, 0210, 0230, 0240, and 0260; the DESMOPHEN series (available from Miles Inc.) of saturated polyester polyols such as DESMOPHEN 2000, 2500, 2501, 2001KS, 2502, 2505, 1700, 1800, and 2504; the RUCOFLEX series (available from Ruco Corp.) of saturated polyester polyols such as S-107, S-109, S-1011 and S-1014; VORANOL 234-630 (a trimethylol propane) from Dow Chemical Company; VORANOL 230-238 (a glycerol polypropylene oxide adduct) from Dow Chemical Company; the SYNFAC series (from Milliken Chemical) of polyoxyalkylated bisphenol A's such as SYNFAC 8009, 773240, 8024, 8027, 8026, and 8031; and the ARCOL series (from Arco Chemical Co.) of polyoxypropylene polyols such as ARCOL 425, 1025, 2025, 42, 112, 168, and 240.

Additionally, and optionally, up to 50% of the total volume of the composition (based on the epoxy-containing material, the polyester or acrylate component, the photoinitiator, and the optional hydroxyl-containing material), may be provided by various fillers, adjuvants, additives and the like such as silica, glass, clay, talc, pigments, colorants, glass beads or bubbles, glass or ceramic fibers, antioxidants, and the like so as to reduce the weight or cost of the composition, adjust viscosity, and provide additional reinforcement. Fillers and the like which are capable of absorbing the radiation used during the curing process should be used in an amount that does not adversely affect the curing process.

Other ingredients that may be added to the melt-flowable composition include polyacetals, reinforcing copolymers, and polycaprolactone diols. Further examples include glycidyl methacrylate, silanes, and other species to provide for crosslinking between separated polymeric phases.

Although melt-flowable composition 12 is shown in FIG. 1 as a single layer, two or more melt-flowable layers having different melt flow properties may be laminated together to form the melt-flowable composition. For example, the top layer can be formulated to have greater flow properties than the bottom layer, while the bottom layer is formulated to have higher strength for better handling properties. Other layers that may be included are, a pressure-sensitive adhesive layer which may be thermosettable or not, a layer capable of cross-linking with the melt-flowable layer at the interface between the two layers, a nonwoven web, or a polymeric film, e.g., a thermoplastic film that is preferably dimensionally stable at the temperatures of application and use. Tie layers may also be included for promoting adhesion between the melt-flowable composition and polymeric cap 14.

Various methods of bonding the additional layers to the melt-flowable layer include techniques known in industry such as heat lamination, bonding with a pressure-sensitive adhesive, co-extruding the second layer with the melt-flowable layer, hot melt coating, direct coating of the second layer to the first, and the like.

Manufacture

The cap can be prepared in any number of different ways. The materials for providing the cap can be melted and stirred in a suitable mixing vessel (e.g., a batch mixer, an extruder, etc.) at an elevated temperature low enough to avoid activating any thermal curatives present in the cap composition. After mixing, the cap composition can be formed into its final shape by a variety of different methods. For example, the cap composition can be profile molded directly, or it can be pelletized and then re-extruded, thermoformed or injection molded to the desired profile.

In one preferred method of manufacture, the cap-forming ingredients are compounded using a twin screw extruder adjusted to provide an appropriate barrel temperature profile. Typically, the feed end of the extruder is set at a relatively low temperature, e.g., about 60–70° C., and the temperature is increased along the length of the barrel such that the temperature is high enough to mix the cap-forming ingredients into a uniform blend, but low enough to avoid activating any thermal catalyst at the die end of the extruder. Preferably the extruder has one or more vent ports along the barrel toward the die end so that a vacuum can be applied to remove entrapped air. The composition is extruded through an appropriate die (e.g., a strand die) into a water trough that cools the strands sufficiently to permit them to be cut into pellets. The pellets are then dried at a temperature low enough to prevent agglomeration of the pellets, typically about 40–60° C. The pellets are then extruded with a single screw extruder having a die configured to provide the desired shape for the cap. The extruded cap can then be cut to the desired length for later processing or use.

After the cap composition is formed into the desired profile, it is exposed to actinic and/or thermal radiation to B-stage the cap composition (if the cap composition contains a thermosettable component). Preferably, the cap composition is exposed to visible light radiation to activate the photoinitiator and B-stage the cap composition.

Optionally, the cap composition may be thermoformed or heat treated to refine and customize the shape of all or part of the cap composition after profile extrusion and before B-staging.

The resulting cap can be mated with the melt-flowable composition in a variety of ways. The cap and the melt-flowable composition, in the form of separate strips or tapes, can be laminated together using, for example, commercially available nip rollers. If either or both of the cap and the melt-flowable composition are tacky or pressure-sensitive, light pressure is sufficient to bond the components together. Preferably, a temporary, removable release liner is applied to the tacky surface to protect it from contamination. In use, the tackiness of the melt-flowable composition will provide sufficient adhesion to hold the components to a surface until the tape is cured and bonded permanently to the surface.

If neither the cap nor the melt-flowable composition is tacky, the components can be bonded together by heating one or both of the mating surfaces to a temperature at which the surface becomes tacky enough to form a bond by applying light pressure. Alternatively, a tie layer can be used to adhere the two components together. In use, a pressure-sensitive adhesive can optionally be applied to part or all of the lower or bottom surface of the melt-flowable composition to hold the article in place on the substrate until the melt-flowable composition is fully cured.

The cap and the melt-flowable composition can also be mated by coextruding the cap composition and the melt-flowable composition to form a unitary tape or strip.

Alternatively, the melt-flowable composition can be placed as a discrete element on the surface to which the article will be applied, and the cap attached at a later time. For example, the melt-flowable composition can be applied as a tape, or it can be pumped onto the surface as a viscous liquid, paste or gel. Exposure to heat, e.g., from a paint bake oven cycle, will bond the cap to the melt-flowable composition.

Use

Figure 12:
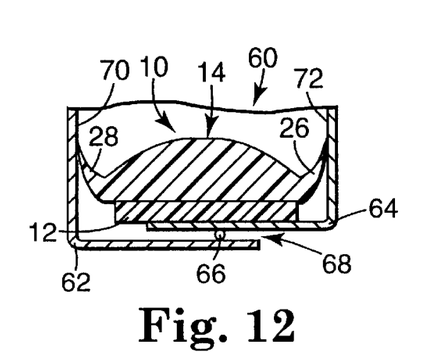
FIG. 12 is an enlarged cross-sectional view of an article according to the invention and similar to that illustrated in FIG. 4 (but excluding the optional bonding material and temporary liner), and after having been placed in a motor vehicle roof ditch but prior to heating the article.
Figure 14:
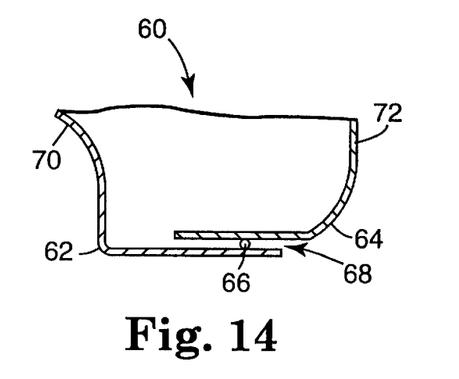
FIG. 14 is an enlarged cross-sectional view of an alternative roof ditch within which an article according to the invention can be placed.
Figure 15:
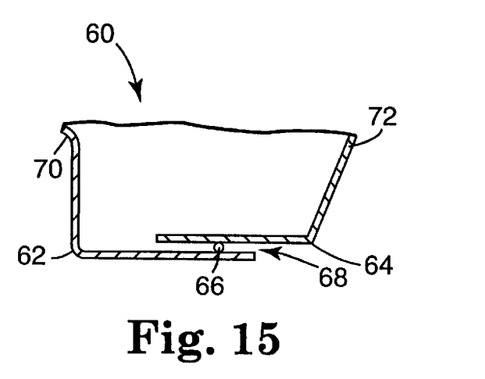
FIG. 15 is an enlarged cross-sectional view of another roof ditch within which an article according to the invention can be placed.

The above-described articles are useful for sealing a variety of discontinuities such as overlap seams or joints, butt seams or joints, depressions or indentations, holes, spot welds, and manufacturing defects. They are particularly useful for sealing joints formed in the floors of motor vehicle roof ditches. Referring now to FIG. 12, an article 10 according to the invention and similar to that shown in FIGS. 1 and 4, but without the optional bonding material 29 and temporary liner 30, is first positioned within a roof ditch 60. Roof ditch 60 is formed by sheet metal panels 62 and 64 (which represent, respectively, a body side panel and a roof panel) that have been assembled together by a spot weld 66 so as to form an overlap joint 68. Extension portions 26 and 28 are dimensioned such that article 10 is wider than the roof ditch. However, the extension portions are sufficiently flexible that they have conformed to the contours of the roof ditch by engaging, preferably in a flush configuration, the interior surfaces of opposed side walls 70 and 72 of roof ditch 60. Thus, article 10 bridges overlap joint 68 along the length of roof ditch 60. Because article 10 is wider than the roof ditch, article 10 is held securely within the roof ditch, and resists being displaced even during heating. Alternative constructions of roof ditch 60, with skewed side walls 70 and 72, are shown in FIGS. 14 and 15.

Once article 10 has been secured within roof ditch 60, it is painted, preferably in an "on-line" electrostatic process, and then heated, for example using existing "on-line" paint bake or paint curing ovens, to a temperature sufficiently high to cause melt-flowable composition 12 to undergo mass flow and seal overlap joint 68, typically about 110–200° C. for 20–40 minutes. In the course of heating, extension portions 26 and 28 soften, thereby bonding cap 14 and article 10 to the interior surfaces of the roof ditch side walls which helps to resist subsequent paint cracking and displacing of the article during the melt sealing operation. However, because the cap is B-staged or formed from a thermoplastic having a high heat deflection temperature, it is relatively rigid and does not undergo mass flow during heating. Thus, the cap substantially retains its shape during heating.

During heating, cap 14 prevents air in the roof ditch which is displaced by melt-flowable composition 12 from percolating up through the melt-flowable composition. The cap thus minimizes the formation of defects in the surface of the final molding such as bumps, ripples and ridges, as well as preventing gaps in the sealant.

Figure 13:
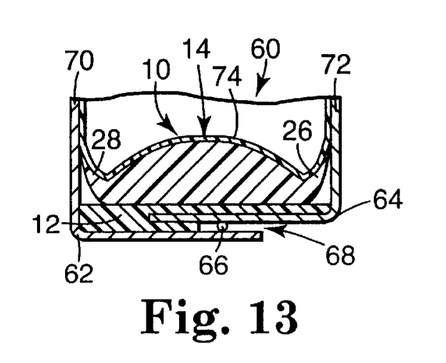
FIG. 13 is an enlarged cross-sectional view similar to FIG. 12 after the article has been heated to secure it within and seal the roof ditch.

Following heating, the entire assembly is cooled, resulting in the structure shown in FIG. 13, in which article 10 with associated paint layer 74 is secured within roof ditch 60. Melt-flowable composition 12 fills the area underneath cap 14 and seals overlap joint 68.

The invention will now be further described by way of the following non-limiting examples.

EXAMPLES

Various tradenames and abbreviations are used in the examples, which may be interpreted according to the following schedule.

Dynapol™ S 1227—Hydroxyl functional, semi-crystalline polyester resin available from Hüls America, Inc., with a melting point of 99° C., a glass transition temperature of 13° C., and a melt flow rate at 160° C. of 45 g/10 minutes.

Dynapol™ S 1359—Hydroxyl functional, semi-crystalline polyester resin available from Hüls America, Inc., with a melting point of 88° C., a glass transition temperature of –16° C., and a melt flow rate at 160° C. of 100 g/10 minutes.

Dynapol™ S 1402—Hydroxyl functional, semi-crystalline polyester resin available from Hüls America, Inc., with a melting point of 92° C., a glass transition temperature of –12° C., and a melt flow rate at 160° C. of 120 g/10 minutes.

Polyester Resin I—Hydroxyl functional, semi-crystalline copolymer of 50 wt. % butane diol, 23 wt. % terephthalic acid, and 27 wt. % sebacic acid, with a melting point of 116° C., a glass transition temperature of –40° C., and a melt flow rate at 160° C. of 250 g/10 minutes.

Unilin™ 700—microcrystalline wax available from Petrolite Company.

Valox™ 420SEO-8051 –30 wt. % glass reinforced polybutylene terephthalate thermoplastic polyester resin, available from General Electric Plastics.

Iron catalyst powder—Cp(Xylenes)Fe$^+$SbF$_6^-$ also described as: (eta$^6$-xylenes)(eta$^5$-cyclopentadienyl)iron (1+) hexafluoroantimonate—disclosed in U.S. Pat. No. 5,089,536 (Palazotto). (Cp=cyclopentadiene.)

Amicure™ CG1200—Dicyandiamide curing agent, available from Air Products Company.

Curezol™ 2MZ-Azine—an imidazole curing agent for epoxy resins, available from Air Products Company.

Epon™ 828—diglycidyl ether of bisphenol A (epoxy equivalent weight of 185–192 g/eq), available from Shell Chemical Company.

Epon™ 1001F—diglycidyl ether of bisphenol A (epoxy equivalent weight of 525–550 g/eq), available from Shell Chemical Company.

Araldite™ ECN 1299—Epoxy cresol novolac resin (epoxy equivalent weight of 217–244), available from Ciba-Geigy Corporation.

Epoxy resin I—Bisphenol A endcapped aliphatic epoxy resin, as described in Example 1 of U.S. Pat. No. 5,407,978 (Bymark et. al.).

Melinex™ 054—treated biaxially oriented polyester film available from ICI Americas.

Cab-O-Sil™ M5—fumed silica available from Cabot Corp.

Example 1

A cap composition was prepared by blending 58 parts of a hydroxyl functional semi-crystalline polyester (Dynapol™ S1227), 20 parts of a second hydroxyl functional semi-crystalline polyester (Dynapol™ S1359), 20 parts of an epoxy resin (Epon™ 1001), 1 part microcrystalline wax (Unilin™ 700), and 1 part iron catalyst powder in a Berstorff twin screw extruder. The barrel temperatures and screw speeds were adjusted to keep the melt temperature below about 110° C. and the temperatures ranged from about 90° C. to about 100° C. The composition was extruded through a die with a 2.54 cm wide profile and having a central portion which provided an approximately 1.9 cm wide body portion for the cap. The cap thinned out so as to yield opposed, laterally extending wings in the cap, each wing having approximately the same dimensions. The wings tapered in the thickness direction away from the body portion to a thickness of about 0.25 mm at the tips. The bottom surface of the cap was substantially flat and the top was rounded in a convex profile. The thickest part of the cap was about 3 mm. The shape of the cap was similar to that shown in FIG. 1. The extruded cap was cooled in a water trough of about 30° C.

Examples 2–5

For Example 2, a winged cap was prepared as described in conjunction with Example 1 except that the composition contained 73 parts Dynapol™ S1227 polyester, 25 parts Epon™ 1001, 1 part Unilin™ 700 microcrystalline wax, and 1 part iron catalyst powder. It was noted that the extruded cap exhibited only a slight amount of die swell, so the shape of the cap was very close in dimensions to the die. A strip of the cap measuring about 25 cm in length was left under normal indoor fluorescent lights for about two weeks after which the cap was B-staged. Then one end of the strip was drawn across a silicone coated polyester film on a hot plate to soften and shape the end. This indicated that the cap was still formable under heat and pressure after B-staging. The formed cap was then heated in an oven at 177° C. for 30 minutes. There was no evidence of mass flow in the sample, indicating that the cap had B-staged sufficiently to retain its shape. The cap could be painted prior to oven heating.

A melt-flowable composition (referred to as Sealant A) was prepared by blending 10 parts of Epon™ 828 epoxy resin, 30 parts of Epoxy Resin I, 7 parts dicyandiamide, 3 parts 2MZ-Azine, 0.9 parts Unilin™ 700, and 59.1 parts of Dynapol™ S 1402. The composition was extruded as a 1.0 mm thick sheet onto a silicone coated release liner using a twin screw extruder as described in conjuction with Example 1. The sheet was then cut into 1.27 cm wide strips of Sealant A.

For Example 3, the B-staged cap of Example 2 was laminated to the sealant tape by heating Sealant A and the cap simultaneously with a heat gun and pressing the cap onto the tape.

For Example 4, a reinforced version of Sealant A was produced by extruding the composition used to provide Sealant A onto a treated polyester film (Melinex™ 054). Then the bottom surface of the B-staged cap of Example 2 was heated with a heat gun and laminated to the polyester film to make a reinforced article comprising the cap, the polyester film, and the melt-flowable sealant.

For Example 5, one surface of a strip of Sealant A was heated with a heat gun so that the surface was tacky, and then a strip of anodized aluminum foil (4 mm thick by 12.7 mm wide by 25 cm long) was laminated to the tacky surface. The bottom surface of the B-staged cap of Example 2 was then heated and laminated to the aluminum foil.

Each of Examples 3–5 were then placed in a simulated roof ditch assembled by spot welding together two 30 cm L-shaped steel bars to form a U-shaped channel that was about 1.3 cm wide and 1.3 cm deep. The roof ditches with the articles placed therein were baked in an oven for 12 minutes at 177° C. In each case, the sealant layer flowed to seal the joint, the irregularities of the sheet metal were not visible through the cap layer, and the cap substantially retained its original profiled shape. The combined assembly comprising the cap and the roof ditch could be painted before oven heating.

Example 6

A cap composition was produced by mixing 20 parts of Epon™ 1001 epoxy resin, 78 parts of Dynapol™ S1227 polyester resin, 1 part Unilin™ 700 microcrystalline wax, and 1 part iron catalyst powder. The composition was extruded using a Baker Perkins twin screw extruder into a cap having the profile described in Example 1. The extrusion conditions were the same as those described in conjunction with Example 1. The extruded cap was cooled in a water trough.

After drying, a 15.2 cm long strip of the cap was laminated to the reinforced Sealant A prepared as described in Example 4 by using a heat gun to warm the bottom surface of the cap to a tacky state.

The article comprising the cap composition, the aluminum foil layer, and the melt-flowable sealant was exposed to a super high actinic lamp (Black Ray Lamp Model No. XX-15L, from UVP Inc., San Gabriel, Calif., equipped with two bulbs, Model TLD15W/03 from Philips B. V., the Netherlands) at a distance of 2.54 cm to activate the catalyst and to B-stage the cap composition. The article with the B-staged cap was then placed into a simulated roof ditch prepared by welding together two 30.5 cm long pieces of L-shaped steel to form a U-shaped channel having an overlap joint in the floor of the channel. The pieces of steel were skewed slightly so that one end of the channel was 12.7 mm wide and the other end was about 25.4 mm wide. The depth of the channel was 12.7 mm. The channel with the article was placed in an oven at 177° C. for 30 minutes. After cooling, the sample was inspected. The cap substantially retained its original profile, displayed very clean and straight lines, and had a good aesthetic appearance. The sealant layer melted and flowed to effectively seal the joint in the channel but was substantially confined to the area beneath the cap. The combined assembly comprising the cap and the roof ditch could be painted before oven heating.

Example 7

A cap composition was prepared by blending 62.5 parts of Polyester Resin I, 26.8 parts of Epon™ 1001 epoxy resin, 0.9 part iron catalyst powder, 0.9 part of Unilin™ 700 microcrystalline wax, and 8.9 parts of Cab-O-Sil™ M5 silica in a twin screw extruder as described in conjunction with Example 1. The composition was then extruded as both a cap as described in Example 1, and through a stranding die. The cap was cooled in a water trough, dried, and wound onto a roll. The strands were cooled in a water bath and then chopped into pellets for later extrusion into a cap.

Examples 8–10

Cap compositions for Examples 8 and 9 were prepared in the following manner. Raw materials were batch mixed (using the compositions shown in Table 1 below in which the amounts are reported in parts) in a ribbon blender and fed into an extruder with one feeder. The formulations were melt processed at an average feed rate of 35 kilograms/hr using a Werner & Pfleiderer 53 mm, co-rotating, six zone twin screw extruder. The screw speed was 85 rpm, and the zone temperatures ranged from 10° C. to 90° C., and the die temperature was 90° C. Compounded material was extruded through a four strand die into a 15° C. recirculating water trough. The strands were air dried, dusted with talc, and then pelletized, mixed, and packaged for extrusion.

TABLE 1

| Raw Material | Example 8 | Example 9 |
|---|---|---|
| Polyester resin I | 70 | 70 |
| Epoxy resin I | 28 | — |
| Epon ™ 1001F | — | 28 |
| Unilin ™ 700 | 1 | 1 |
| Iron catalyst powder | 1 | 1 |

A cap composition for Example 10 was prepared as follows. Into nine small metal containers was weighed 69 g Polyester Resin I, and 30 g Araldite™ ECN 1299 epoxy resin. All nine containers were heated in an oven at 120° C. until the material was molten, about 30 minutes. The material in each container was stirred by hand and then returned to the oven for another 15 minutes. During this time a knife coater was heated to a temperature of approximately 80° C. A conventional silicone-coated polyester release liner was threaded through the knife coater and the gap was set to 1 mm. Then, one by one, each container was removed from the oven, 1 g iron catalyst powder was added and mixed in by hand, and the mixture was coated with the hot knife coater. Nine handspreads of 100 g each were made. When the handspreads cooled, they were cut into strips 2–5 mm in width using a paper cutter and scissors. These strips were then cut into pellets using a using model No. 304 Pelletizer, Jetro Division, Bay City, Mich.

Caps were then prepared using the pellets from Examples 8–10. For each example, the pellets were melted and extruded into a profiled cap using a Killion™ 32 mm, three zone, single screw extruder screw (Killion Extruders, Inc., Davis-Standard Corporation, Cedar Grove, N.J.) configured with a 2-stage screw. This screw configuration consisted of the following zones from beginning to end: feeding, compression, metering, restriction, decompression, devolatilization, compression and metering. Using this configuration, the pellets were melted in the first stage, and the melt was cooled in the second stage. No devolatilization was carried out. The extruder was fitted with a profile die which yielded a cap having substantially the shape shown in FIG. 9, and with the dimensions reported in Table 2. The extruder was run at 25 rpm and the cap composition feed rate was approximately 3.3 kg/hr. The extruder zones and die were set at the following temperatures: Zone 1=120° C., Zone 2=120° C., Zone 3=55° C., and die=113° C. The melt temperature was approximately 90° C. for all three cap compositions. The web rate, adjusted with a puller was 0.5 m/minute. The cap was extruded from the die into a 21° C. recirculating water trough. The water trough and web puller were both obtained from Killion Extruders, Inc. The distance from the die to the trough opening was approximately 1.5 cm. The water level was adjusted so that very little water spilled out of the opening. The cap was then cut into lengths of about 40 cm and collected.

TABLE 2

| | Average Dimensions of Caps |
|---|---|
| Right wing thickness (mm) | 0.75 mm |
| Right wing length (mm) | 2.8 mm |
| Left wing thickness (mm) | 0.35 mm |
| Left wing length (mm) | 2.8 mm |
| Body width (mm) | 15.1 mm |
| Body height (mm) | 5.3 mm |
| Total cap width (mm) | 21.5 mm |

The caps of Examples 8–10 were B-staged by exposing the extruded, profiled shapes to a 500 watt tungsten halogen floodlight (#2V623 from Dayton Electrical Mfg. Co., Chicago, Ill.). The light source was placed 13 cm from the top surface of the cap and each cap was exposed for 30 seconds on each side. The moldings were then aged for 17 hours in an oven at 70° C. The aging temperature was below the melting point of the semi-crystalline cap composition. One cap from each of Examples 8–10 was then heated in a 150° C. oven for 20 minutes followed by visual inspection. All three caps retained their shape during the high temperature bake, indicating that they had reached the B-stage prior to being placed in the oven.

In an alternative method, the cap of Example 8 was exposed to the same 500 watt tungsten halogen floodlight during the extrusion process. The light was mounted at a distance of 19 cm from the extrudate surface. The light, 19 cm in width, covered the space between the extruder die and trough, and extended over a portion of the first compartment of the water trough. The light source irradiated the cap for about 23 seconds, at a web rate of 0.5 m/minute. The cap was then aged in a 70° C. oven for 17 hours. After baking at 150° C. for 20 minutes, the cap retained its shape after oven heating and subsequent cooling.

A melt-flowable sealant composition (referred to as Sealant B) was prepared as follows. Into a small metal container was weighed 59 g Dynapol™ S1402, 1 g Unilin™ 700, 15 g Epon™ 828, and 15 g Epoxy Resin I. The container was heated in an oven at 177° C. until the material was molten, about 30 minutes. The material was stirred by hand and then returned to the oven for another 15 minutes. The sample was then removed from the oven and the oven temperature was lowered to 120° C. When the oven temperature reached 120° C., the sample was returned to the oven. During this time a knife coater was heated to a temperature of approximately 80° C. A conventional silicone-coated polyester release liner was threaded through the knife coater and the gap was set to 1 mm. Then the container was removed from the oven, and a mixture of 7 g CG-1200 dicyandiamide and 3 g Curezol™ 2MZ-Azine imidazole was added and mixed in by hand. The mixture was then coated with the hot knife coater to make a handspread. When the handspread cooled, it was removed from the release liner and cut into strips of appropriate width using a razor blade.

Following the B-staging process described previously, the caps of Examples 8–10 were laminated to strips of Sealant B by heating the caps with a hot air gun and then pressure laminating the sealant strips to the hot surfaces of the caps.

Upon cooling, the sealant strips could not be easily removed from the caps. Each cap-sealant construction was placed in a simulated roof ditch similar to the one described in conjunction with Examples 3–5, and the construction was baked at 150° C. for 25 minutes. Visual inspection of each of the samples showed that the sealant had melted, flowed into, and sealed the joint, the cap was bonded firmly to the bottom of the joint by the sealant, the wings of the caps were adhered to the joint wall, and the dimensions of the cap had not changed. The combined assembly comprising the cap and the roof ditch could be painted before oven heating.

Example 11

A cap composition was prepared by drying Valox™ 420SEO-8051, thermoplastic polyester resin pellets for 12 hours at 107° C. and cooling to room temperature. The dried pellets were extruded into a shaped cap using a 4.45 cm diameter HPM single screw extruder, operating at 33 rpm with throat cooling and zone temperatures ramping from 200° C. to 240° C. A strip of Sealant B (described above) measuring 30 cm by 1 cm was laminated to the cap by heating the cap with a hot air gun and then pressure laminating the strip of Sealant B to the hot surface of the cap. The resulting construction was placed in a roof ditch similar to that described in conjunction with Example 6 (except with a uniform width of about 38 mm) to form an assembly. A 0.15 mm thick film of BASF primer U28RK035 was spray applied over the assembly including the inside walls of the joint. The assembly was baked at 154° C. to cure the primer, then cooled to room temperature. A 0.508 mm thick film of DuPont Generation® III basecoat 692-DT068 (F45366) was spray applied, conditioned for 5 minutes at ambient temperature, and then a 0.508 mm thick film of DuPont Generation® III clearcoat RKF45500 was applied. The assembly was baked at 143° C. for 25 minutes. The painted molding had 100% adhesion as measured by the cross hatch adhesion test. (The painted surface of the cap was cross-hatched with a knife into small rectangles. A piece of pressure-sensitive adhesive filament tape was applied to the cross-hatching with heavy finger pressure. The tape was then pulled rapidly from the cap. 100% indicated that none of the cross-hatched rectangles were removed.) Visual inspection showed that the sealant had melted, flowed into and sealed the metal joint, the molding was bonded firmly to the metal substrate, and the dimensions of the molding had not changed.

Other embodiments are within the following claims.

What is claimed is:

1. An article adapted for placement over a discontinuity to seal said discontinuity, the article comprising:
   (a) a melt-flowable composition characterized by a first width that flows and seals the discontinuity over which said article is placed when said article is heated to a temperature sufficient to cause said melt-flowable composition to flow, and then cooled; and
   (b) a shaped polymeric cap permanently attached to the melt-flowable composition and having a pre-selected, cross-sectional profile characterized by a second width and a shape in which the thickness of the cap across its width, the width of the cap, or both the width and the thickness of the cap vary, said cap controlling the melt-flow behavior of said melt-flowable composition to substantially confine said melt-flowable composition to an area underneath said cap when said article is heated to a temperature sufficient to cause said melt-flowable composition to flow, said pre-selected cross-sectional profile of said cap being substantially retained when said article is heated to a temperature sufficient to cause said melt-flowable composition to flow, and then cooled.

2. An article according to claim 1 wherein said cross-sectional profile is characterized by a pair of opposed extensions, one of which is tapered in the thickness direction.

3. An article according to claim 1 wherein said cross-sectional profile is characterized by a pair of opposed extensions, both of which are tapered in the thickness direction.

4. An article according to claim 1 wherein said second width is greater than said first width.

5. An article according to claim 1 wherein said article further comprises a stiffening member.

6. An article according to claim 5 wherein said stiffening member comprises a metal insert.

7. An article according to claim 1 wherein said stiffening member comprises a dimensionally stable plastic insert.

8. An article according to claim 1 wherein said melt-flowable composition comprises a semi-crystalline, thermosetting composition comprising an epoxy-polyester blend.

9. An article according to claim 1 wherein said melt-flowable composition comprises a thermosetting composition comprising an epoxy-acrylate blend.

10. An article according to claim 1 wherein said melt-flowable composition comprises a thermosetting composition comprising an ethylene vinyl acetate-elastomer blend.

11. An article according to claim 1 wherein said melt-flowable composition comprises a plurality of melt-flowable layers.

12. An article according to claim 1 wherein said cap comprises a B-staged thermosetting composition.

13. An article according to claim 12 wherein said B-staged thermosetting composition comprises a B-staged epoxy-polyester blend.

14. An article according to claim 1 wherein said cap comprises a thermoplastic composition.

15. An article according to claim 1 wherein said cap is covalently bonded to said melt-flowable composition.

16. An article according to claim 1 wherein said cap comprises a plurality of layers.

17. An article according to claim 1 wherein said cap comprises a paint-receptive surface paintable to a substantially Class A finish.

18. An article according to claim 1 wherein said cap comprises a paint-receptive surface having an electrical conductivity sufficient to enable said cap to be electrostatically painted.

19. An article according to claim 1 wherein said article is adapted for placement over a seam or joint formed in the floor of a recessed area.

20. An article according to claim 1 wherein said article is adapted for placement over a joint formed in the floor of a roof ditch of a vehicle.

21. An article adapted for placement over a joint formed in the floor of a roof ditch of a vehicle, the article comprising:
   (a) a melt-flowable composition characterized by a first width that flows and seals said joint when said article is heated to a temperature sufficient to cause said melt-flowable composition to flow, and then cooled; and
   (b) a shaped polymeric cap permanently attached to the melt-flowable composition and having a pre-selected, cross-sectional profile characterized by a second width and a shape in which the thickness of the cap across its width, the width of the cap, or both the width and the thickness of the cap vary, said cap controlling the melt-flow behavior of said melt-flowable composition to substantially confine said melt-flowable composition to an area underneath said cap when said article is heated to a temperature sufficient to cause said melt-flowable composition to flow, said cross-sectional profile of said cap being characterized by a pair of opposed extensions to secure said article in place over said joint, said pre-selected cross-sectional profile of said cap being substantially retained when said article is heated to a temperature sufficient to cause said melt-flowable composition to flow, and then cooled.

22. An article adapted for sealing a discontinuity in a surface, the article comprising:
(a) a melt-flowable composition characterized by a first width that flows and seals said discontinuity when said article is heated to a temperature sufficient to cause said melt-flowable composition to flow, and then cooled; and
(b) a polymeric cap permanently attached to the melt-flowable composition; wherein said polymeric cap has a second width that is greater than said first width, and a pre-selected, cross-sectional profile characterized by a shape in which the thickness of the cap across its width, the width of the cap, or both the width and the thickness of the cap vary; said cap controlling the melt-flow behavior of said melt-flowable composition to substantially confine said melt-flowable composition to an area underneath said cap when said article is heated to a temperature sufficient to cause said melt-flowable composition to flow, and then cooled.

23. The article of claim 22, wherein the cross-sectional profile remains substantially unchanged at a temperature sufficient to cause the melt-flowable composition to flow.

24. The article of claim 22, wherein the polymeric cap comprises two or more cap layers including an innermost cap layer next to the melt-flowable composition and an outermost cap layer forming an outer surface of the polymeric cap; each layer of the polymeric cap has a modulus; and wherein the modulus of each of the two or more cap layers increases from a lowest modulus in the innermost cap layer to a highest modulus in the outermost layer to form a modulus gradient within the polymeric cap.

25. The article of claim 22, wherein the polymeric cap comprises one or more channels or pockets along a lower surface of the polymeric cap adjacent to the melt-flowable composition.

26. The article of claim 22, further comprising at least one of a pressure-sensitive adhesive layer and a release liner layer.

* * * * *